US008891015B2

(12) United States Patent
 Sahashi

(10) Patent No.: US 8,891,015 B2
(45) Date of Patent: Nov. 18, 2014

(54) ELECTRONIC APPARATUS AND DISPLAY CONTROL METHOD

(71) Applicant: Kabushiki Kaisha Toshiba, Tokyo (JP)

(72) Inventor: Masaya Sahashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/967,634

(22) Filed: Aug. 15, 2013

(65) Prior Publication Data

US 2013/0342759 A1 Dec. 26, 2013

Related U.S. Application Data

(63) Continuation of application No. PCT/JP2013/057941, filed on Mar. 13, 2013.

(30) Foreign Application Priority Data

Jun. 22, 2012 (JP) ................................. 2012-141026

(51) Int. Cl.
| | | |
|---|---|---|
| *H04N 7/00* | (2011.01) | |
| *H04N 11/00* | (2006.01) | |
| *H04N 21/4363* | (2011.01) | |
| *H04N 5/268* | (2006.01) | |
| *H04N 21/654* | (2011.01) | |
| *H04N 21/4143* | (2011.01) | |
| *H04N 21/6547* | (2011.01) | |
| *H04N 21/41* | (2011.01) | |

(52) U.S. Cl.
CPC ......... *H04N 5/268* (2013.01); *H04N 21/43635* (2013.01); *H04N 21/654* (2013.01); *H04N 21/4363* (2013.01); *H04N 21/43637* (2013.01); *H04N 21/4143* (2013.01); *H04N 21/6547* (2013.01); *H04N 21/4122* (2013.01)
USPC ............ 348/552; 348/563; 348/565; 715/718

(58) Field of Classification Search
CPC .......... H04N 7/00; H04N 11/00; H04N 5/44; H04N 5/268; H04N 5/4403; H04N 5/44583; H04N 5/44591; H04N 5/4401; H04N 7/173; H04N 7/16; H04N 7/181
USPC ................. 348/552–569, 705, 706, 734, 725; 725/105, 108, 110, 141; 715/718, 717
See application file for complete search history.

(56) References Cited

U.S. PATENT DOCUMENTS

| | | | |
|---|---|---|---|
| 6,851,116 B1 | 2/2005 | Yoshikawa | |
| 2007/0182853 A1* | 8/2007 | Nishikawa | .................... 348/554 |

(Continued)

FOREIGN PATENT DOCUMENTS

| | | | |
|---|---|---|---|
| JP | 2000-307594 A | 11/2000 | |
| JP | 2001-094890 A | 4/2001 | |
| JP | 2007-036948 A | 2/2007 | |

(Continued)

OTHER PUBLICATIONS

International Search Report mailed by Japan Patent Office on Jun. 25, 2013 in the corresponding PCT Application No. PCT/JP2013/057941.

*Primary Examiner* — Michael Lee
(74) *Attorney, Agent, or Firm* — Knobbe, Martens, Olson & Bear LLP

(57) ABSTRACT

According to one embodiment, an electronic apparatus includes a receiver, a reproducer, a display, a transmitter, and a processor. The receiver receives video content data. The reproducer generates first video data by reproducing the video content data. The display displays an image corresponding to the first video data on a screen of the display. The transmitter transmits image data including the first video data to an external display device. The processor transmits a mode switching request including identification information to identify the video content data to the external display device from a first mode to a second mode.

7 Claims, 7 Drawing Sheets

(56) References Cited

U.S. PATENT DOCUMENTS

2010/0110294 A1* 5/2010 Oka ............................ 348/564
2010/0263016 A1 10/2010 Itoga
2012/0050012 A1* 3/2012 Alsina et al. ................. 340/10.1

FOREIGN PATENT DOCUMENTS

| JP | 2009-089275 A | 4/2008 |
| JP | 2008-258683 A | 10/2008 |
| JP | 2010-081638 A | 4/2010 |

* cited by examiner

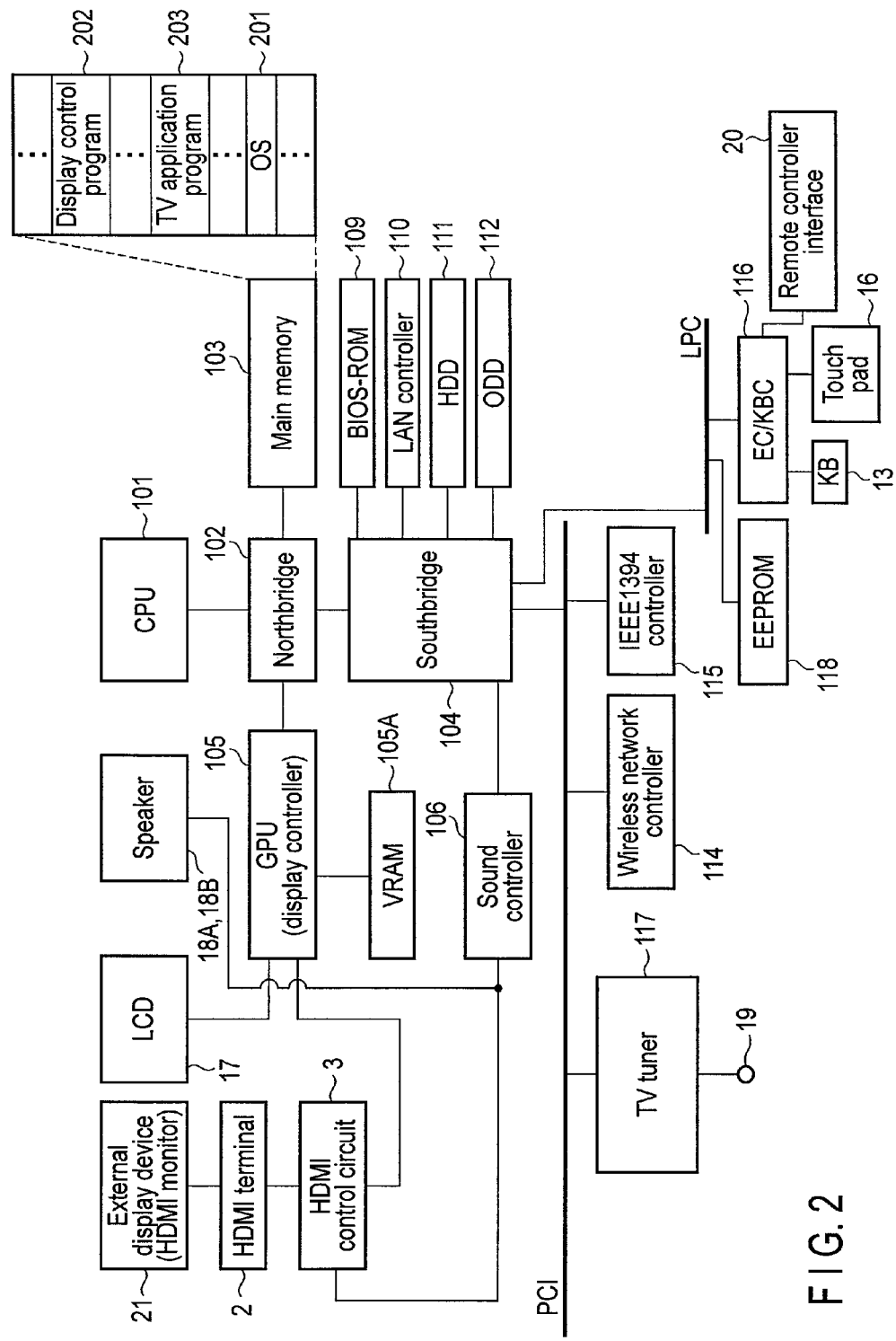
F I G. 2

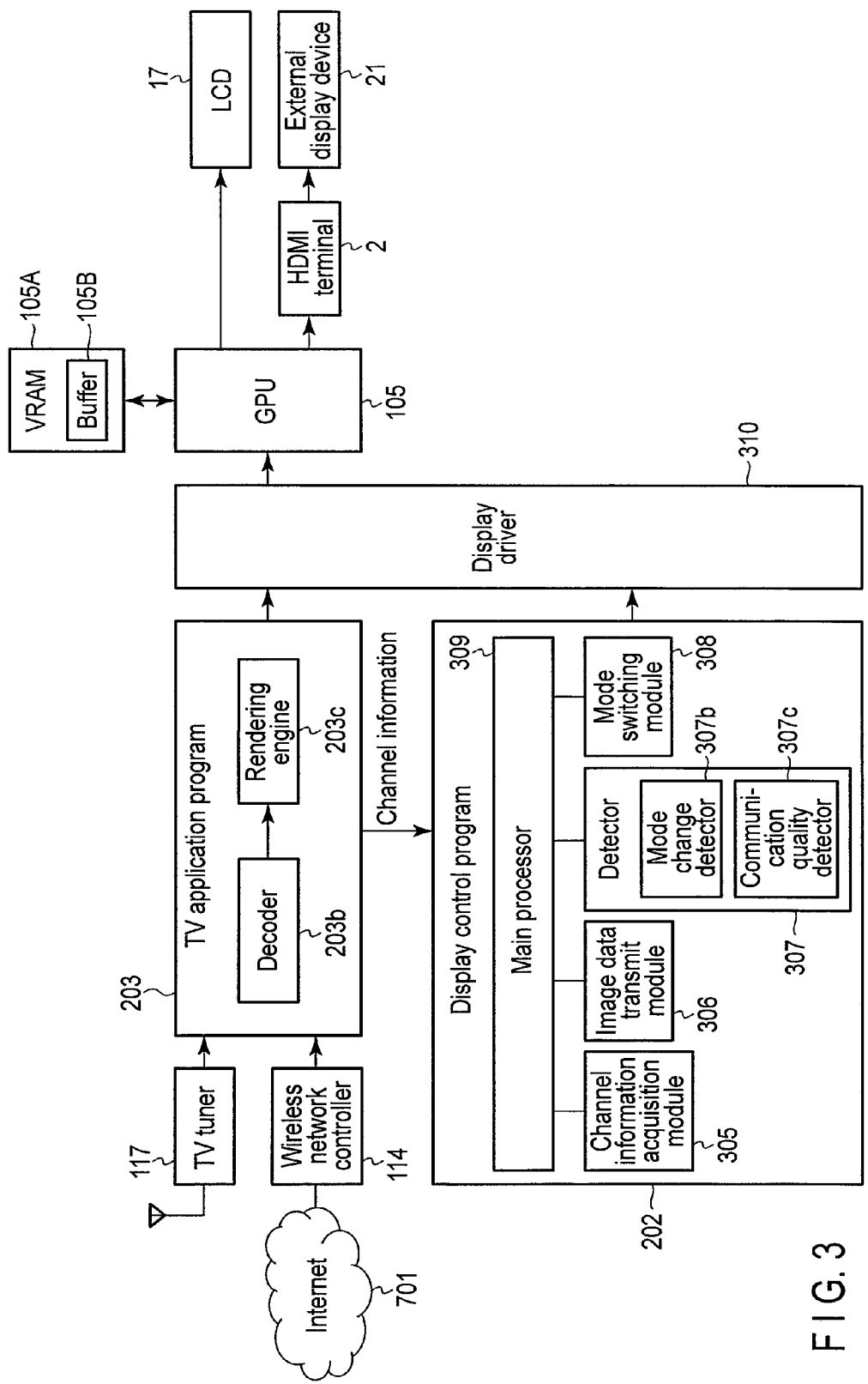
F I G. 3

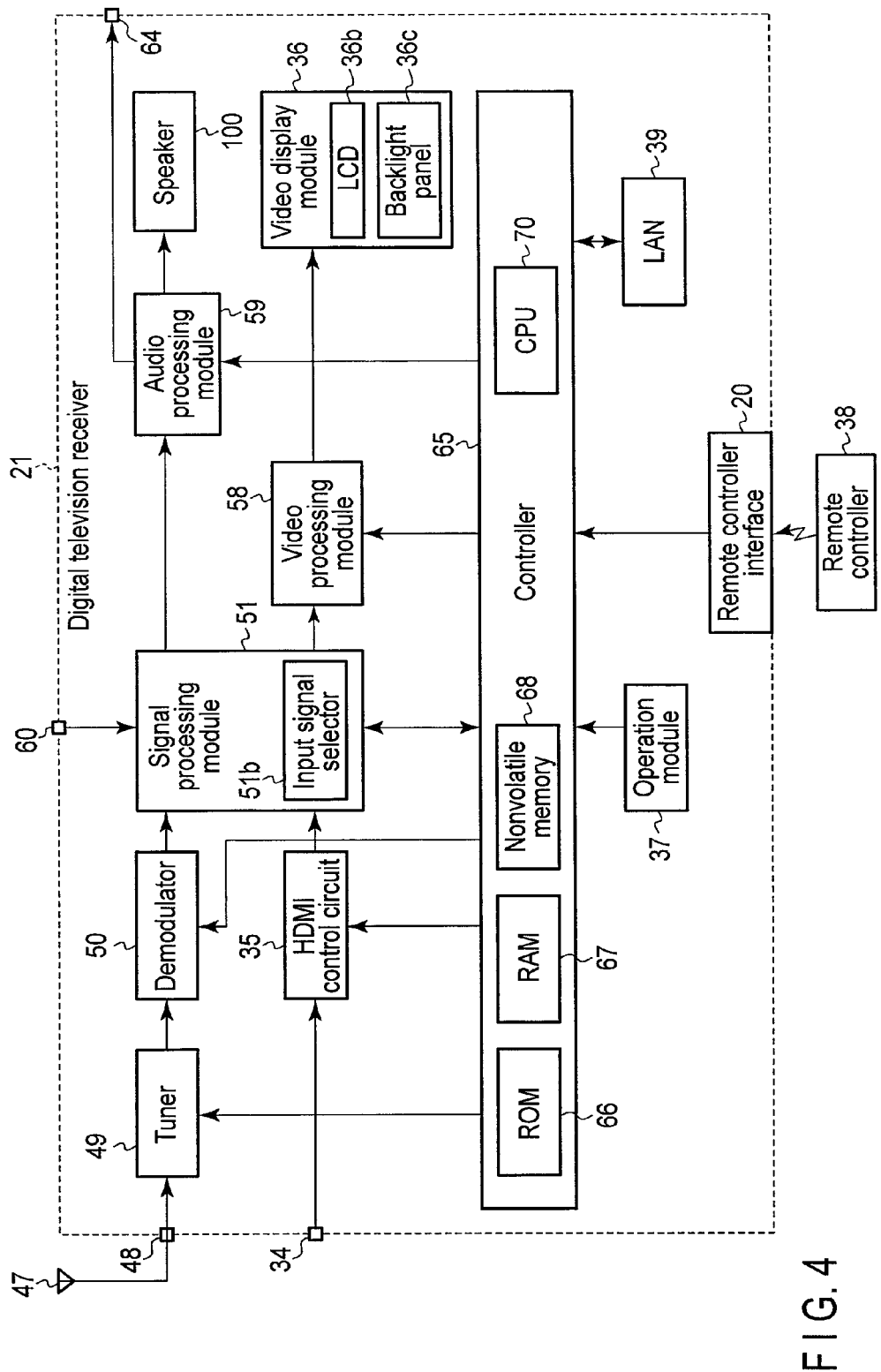
F I G. 4

ELECTRONIC APPARATUS AND DISPLAY CONTROL METHOD

CROSS REFERENCE TO RELATED APPLICATIONS

This application is a Continuation Application of PCT Application No. PCT/JP2013/057941, filed Mar. 13, 2013 and based upon and claiming the benefit of priority from Japanese Patent Application No. 2012-141026, filed Jun. 22, 2012, the entire contents of all of which are incorporated herein by reference.

FIELD

Embodiments described herein relate generally to an electronic apparatus capable of displaying a video, and a display control method applied to the electronic apparatus.

BACKGROUND

In recent years, various electronic apparatuses such as a personal computer (PC) and a tablet PC are under development. Many electronic apparatuses of this type can externally receive videos.

More specifically, such an electronic apparatus can receive video content data such as broadcast program data, and display a video of the received video content data on the screen of the electronic apparatus. Also, a screen image of the electronic apparatus can be displayed on an external display device such as a television receiver by connecting the electronic apparatus to the external display device.

However, a video can often be displayed with a quality higher when video content data is reproduced using a resource in the television receiver than when video content data is reproduced by the electronic apparatus. This requires implementation of a new function for effectively using a resource in the external display device.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram illustrating an example of the system configuration of the electronic apparatus in the embodiment;

FIG. 3 is an exemplary block diagram illustrating an example of the configuration of a TV application program and display control program executed by the electronic apparatus in the embodiment;

FIG. 4 is an exemplary block diagram illustrating an example of the system configuration of an external display device which displays image data transmitted from the electronic apparatus in the embodiment;

DETAILED DESCRIPTION

Various embodiments will be described hereinafter with reference to the accompanying drawings.

In general, according to one embodiment, an electronic apparatus includes a receiver, a reproducer, a display, a transmitter, and a processor. The receiver receives video content data. The reproducer reproduces the video content data to generate first video data. The display displays an image corresponding to the first video data on a screen of the display. The transmitter transmits image data to an external display device, the image data comprising the first video data. The processor transmits to the external display device a mode switching request including identification information for identifying the video content data to switch an operation mode of the external display device from a first mode in which an image corresponding to the image data is displayed on a screen of the external display device to a second mode in which an image corresponding to second video data is displayed on the screen of the external display device, the second video data being obtained by receiving and reproducing the video content data by resources in the external display device.

The configuration of an electronic apparatus according to one embodiment will be described first with reference to FIGS. 1 and 2. The electronic apparatus in the embodiment is implemented by, for example, a laptop portable personal computer 10. This electronic apparatus may also be implemented by, for example, a tablet computer or a PDA.

The computer 10 has a TV function for executing, for example, reproduction of video content data such as broadcast program data broadcasted by a television broadcast signal. This TV function is implemented by, for example, a TV application installed on the computer 10 in advance.

The computer 10 can also be connected to an external display device. The computer 10 can transmit various image data being reproduced onto the external display device. While, for example, the computer 10 receives and reproduces broadcast program data, it can not only display a video (image) corresponding to the broadcast program data on the display of the computer 10 but also transmit image data including the video corresponding to the broadcast program data to the external display device. With this operation, the video corresponding to the broadcast program data can be displayed on a large screen of the external display device.

Figure 1:
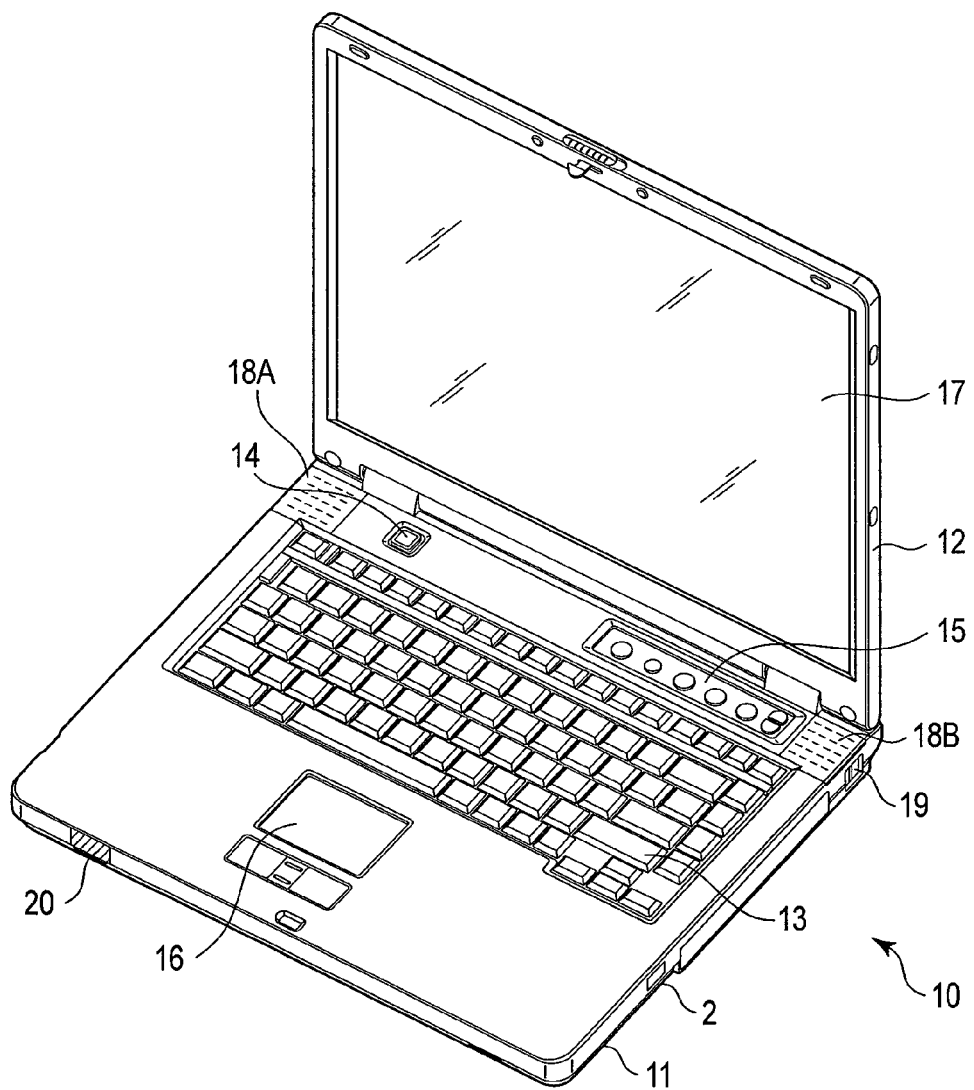
FIG. 1 is an exemplary perspective view showing the external appearance of an electronic apparatus according to one embodiment.

FIG. 1 is a perspective view of the computer 10 while display 12 is open. The computer 10 includes a computer main body 11 and the display 12. An LCD (Liquid Crystal Display) 17 is incorporated in the display 12. The display 12 is attached to the computer main body 11 rotatable between an open position where the upper surface of the computer main body 11 is exposed, and a closed position where the upper surface of the computer main body 11 is covered with the display 12.

The computer main body 11 has a thin box-like housing, and a keyboard 13, a power button 14 for powering the computer 10 on/off, an input operation panel 15, a touch pad 16, and speakers 18A and 18B, for example, are arranged on its upper surface. Various operation buttons are set on the input operation panel 15. A TV broadcast antenna terminal 19 is set on the right surface of the computer main body 11. An external display connection terminal (HDMI terminal) 2 complying with the HDMI (High-Definition Multimedia Interface) standard, for example, is also set on the right surface of the computer main body 11. The HDMI terminal 2 is used to output various image data to an external display.

Moreover, a remote controller interface 20 for communicating with a remote controller which performs remote control of the TV function of the computer 10 is set on the front surface of the computer main body 11. The remote controller interface 20 includes, for example, an infrared signal receiver.

FIG. 2 is a block diagram showing the system configuration of the computer 10.

The computer 10 includes, for example, a CPU (Central Processing Unit) 101, Northbridge 102, main memory 103, Southbridge 104, GPU (Graphics Processing Unit) 105, video memory (VRAM) 105A, sound controller 106, BIOS-ROM 109, LAN (Local Area Network) controller 110, HDD (Hard Disk Drive) 111, ODD (Optical Disk Drive) 112, wireless network controller 114, EC/KBC (Embedded Controller/KeyBoard Controller) 116, and EEPROM (Electrically Erasable Programmable ROM) 118.

The CPU 101 is a processor which controls the operation of each unit in the computer 10. The CPU 101 executes various types of software loaded into the main memory 103 from the HDD 111. These types of software include, for example, an OS (Operating System) 201, display control program 202, and TV application program 203. The TV application program 203 serves to reproduce various video content data received by a receiver such as a TV tuner 117 or the wireless network controller 114. The above-mentioned video content data includes, for example, broadcast program data received by the TV tuner 117, and video content data (for example, a video clip or a home movie) received from an external device via a wireless network by the wireless network controller 114. The TV application program 203 may also have a function of reproducing, for example, video content data received from a server on the Internet.

The display control program 202 serves to transmit image data including video data obtained by reproducing video content data to an external display device 21. While, for example, broadcast program data is reproduced, a video (image) corresponding to video data obtained by reproducing the broadcast program data is displayed on the screen of the LCD 17. Further, this video data is transmitted to the external display device 21 via, for example, the HDMI terminal 2 or a wired network or wireless network. Note that the transmitted image data may include only video data obtained by reproducing broadcast program data. Alternatively, the transmitted image data may be screen image data representing the entire screen image displayed on the screen of the LCD 17.

The CPU 101 also executes a BIOS (Basic Input-Output System) stored in the BIOS-ROM 109. The BIOS is a program for hardware control.

The Northbridge 102 is a bridge device which connects a local bus of the CPU 101 to the Southbridge 104. The Northbridge 102 also includes an internal memory controller which performs access control of the main memory 103. The Northbridge 102 also has a function of executing communication with the GPU 105 via a serial bus complying with, for example, the PCI EXPRESS standard.

The GPU 105 is a display controller which controls the LCD 17 used as a display monitor of the computer 10. A display signal generated by the GPU 105 is sent to the LCD 17.

The GPU 105 can also send a digital video signal to the external display device 21 via an HDMI control circuit 3 and the HDMI terminal 2.

The HDMI terminal 2 can send an uncompressed digital video signal and a digital audio signal to the external display device 21 such as a television via one cable. The HDMI control circuit 3 is an interface for sending a digital video signal to the external display device 21 called an HDMI monitor via the HDMI terminal 2.

The Southbridge 104 controls each device on a PCI (Peripheral Component Interconnect) bus and each device on an LPC (Low Pin Count). Also, the Southbridge 104 includes an internal IDE (Integrated Drive Electronics) controller for controlling the HDD 111. Moreover, the Southbridge 104 has a function of executing communication with the sound controller 106.

The sound controller 106 is a sound generating device, which outputs audio data to be reproduced to the speakers 18A and 18B. The LAN controller 110 is a wired communication device which executes wired communication complying with, for example, the IEEE 802.3 standard. On the other hand, the wireless network controller 114 is a wireless communication device which executes wireless communication complying with, for example, the IEEE 802.11 standard. The wireless network controller 114 functions as a wired communication device which receives video content data from an external device via a wireless network (wired LAN).

The EC/KBC 116 is a one-chip microcomputer which integrates an embedded controller for power management and a keyboard controller for controlling the keyboard 13 and touch pad 16. The EC/KBC 116 has a function of powering the computer 10 on/off in response to the operation of the power button 14 by the user.

The TV tuner 117 is connected to the antenna terminal 19, and receives a television (TV) broadcast signal and tunes in a channel of the television (TV) broadcast signal. The TV tuner 117 is implemented as a digital TV tuner capable of receiving digital broadcast program data in, for example, terrestrial digital TV broadcasting. The TV tuner 117 demodulates broadcast program data corresponding to the currently tuned channel, thereby generating transport stream data. This transport stream data includes, for example, compression-coded video data and compression-coded audio data. This transport stream data is transferred to the main memory 103, and reproduced (decoded) by the TV application program 203. Video data obtained by reproduction (decoding) is rendered in the video memory (VRAM) 105A by the TV application program 203.

The functional configurations of the display control program 202 and TV application program 203 will be described below with reference to FIG. 3.

The TV application program 203 includes a decoder 203b and rendering engine 203c to reproduce video content data. The decoder 203b and rendering engine 203c function as a reproduction module which reproduces video content data to generate video data (digital video signal). For example, the decoder 203b decodes video content data sent from the TV tuner 117 or the wireless network controller 114. The rendering engine 203c renders video data (first video data), obtained by decoding video content data using the decoder 203b, in the video memory (VRAM) 105A via a display driver program 310. The video memory (VRAM) 105A includes a buffer 105B for storing screen image data representing a screen image on the LCD 17. The buffer 105B ensures a storage area corresponding to the window of the TV application program 203. The rendering engine 203c renders each video frame of the above-mentioned first video data in the storage area corresponding to the window of the TV application program 203.

The GPU 105 generates a first video signal for displaying a screen image on the LCD 17, and a second video signal for displaying a screen image on the external display device 21, based on screen image data rendered in the buffer 105B. In this case, in a "clone display mode", a screen image formed by the first video signal is identical to that formed by the second video signal, so identical screen images, that is, identical videos are displayed on the LCD 17 and external display device 21.

The display control program 202 includes a channel information acquisition module 305, image data transmit module 306, detector 307, mode switching module 308, and main processor 309.

The channel information acquisition module 305 acquires identification information to identify the currently reproduced video content data from the TV application program 203. If the currently reproduced video content data is broadcast program data corresponding to a channel tuned by the TV tuner 117, channel information indicating the currently tuned channel is used as the above-mentioned identification information. In this case, the channel information acquisition module 305 acquires channel information indicating the currently tuned channel from the TV application program 203. If the currently reproduced video content data is video content data received from a server on the Internet 701, the URL of the video content data, for example, may be used as the above-mentioned identification information.

The image data transmit module 306 transmits image data including first video data corresponding to the currently reproduced video content data to the external display device 21. This image data may be formed by first video data, or may be screen image data representing the entire screen image displayed on the LCD 17.

If image data is transmitted to the external display device 21 via the HDMI terminal 2, the HDMI control circuit 3 and HDMI terminal 2 function as a transmitter for transmitting the image data to the external display device 21. In this case, the image data transmit module 306 controls the GPU 105 via the display driver program 310. The image data transmit module 306 makes the GPU 105 output a digital video signal corresponding to the above-mentioned image data to the HDMI control circuit 3.

If image data is transmitted to the external display device 21 via a wired LAN or wireless LAN, the LAN controller 110 or the wireless network controller 114 functions as a transmitter for transmitting the image data to the external display device 21. In this case, the image data transmit module 306 reads the image data in the buffer 105B via the display driver program 310, and sends the image data to the LAN controller 110 or the wireless network controller 114.

The mode switching module 308 is configured to execute a process of switching the operation mode of the display driver program 310 in response to a predetermined mode switching event so as to effectively use a resource in the display driver program 310. Since the display driver program 310 can be implemented by a video apparatus such as a TV receiver, the display driver program 310 often has the capability to receive and reproduce video content data identical to video content data reproduced by the computer 10. In this case, a resource in the display driver program 310 to receive and reproduce video content data, such as a TV tuner, a decoder, or a video signal processing engine, often has a capacity higher than capacity of a resource in the computer 10 to receive and reproduce video content data.

To effectively use a resource in the display driver program 310, the mode switching module 308 transmits a mode switching request, including identification information to identify video content data currently reproduced by the TV application program 203, to the external display device 21 so as to switch the operation mode of the external display device 21 from a first mode to a second mode in response to the above-mentioned mode switching event. The mode switching request may be transmitted to the external display device 21 via an HDMI CEC line, or transmitted to the external display device 21 via a wired network or wireless network.

The first mode corresponds to, for example, the external input mode of the display driver program 310. When the external display device 21 is in the first mode, a video corresponding to image data transmitted from the computer 10 to the external display device 21 via, for example, an HDMI cable is displayed on the screen of the external display device 21. In this case, resource such as a TV tuner or a decoder in the external display device 21 does not be used.

The second mode is an operation mode for receiving and reproducing video content data, designated by identification information in a mode switching request, using a resource in the display driver program 310. When the external display device 21 is switched to the second mode, video content data designated by identification information is received and reproduced by a resource in the external display device 21. If, for example, video content data designated by identification information, that is, video content data currently reproduced by the computer 10 is broadcast program data of a predetermined channel, the broadcast program data of this channel is received by the TV tuner in the external display device 21. Broadcast program data is then reproduced by, for example, the decoder and video signal processing engine in the external display device 21. A video corresponding to video data (second video data) obtained by this reproduction operation is displayed on the screen of the external display device 21.

If video content data designated by identification information, that is, video content data currently reproduced by the computer 10 is video content data received from an external device on a network, this video content data is received by, for example, a LAN controller in the external display device 21. The video content data is reproduced by, for example, the decoder and video signal processing engine in the external display device 21. A video corresponding to video data (second video data) obtained by this reproduction operation is displayed on the screen of the external display device 21.

Mode switching events which may become a factor in transmitting a mode switching request to the mode switching module 308, that is, triggers which transmit a mode switching request to the mode switching module 308 are, for example, as follows:

mode switching event 1: a change in display mode of video content data from a window mode to a full-screen mode;

mode switching event 2: degradation in communication quality of a wireless network during the period in which video content data is received from an external device via the wireless network;

mode switching event 3: a user operation.

Mode switching event 1 is used when the above-mentioned image data transmitted from the computer 10 to the external display device 21 is, for example, screen image data representing a screen image displayed on the screen of the LCD 17. While the display mode of video content data being reproduced by the TV application program 203 (the display mode of the TV application program 203) is the window mode, a video corresponding to the video content data is displayed in the TV application program window on the screen of the LCD 17. In this case, the screen image displayed on the screen of the LCD 17 includes not only the video corresponding to the video content data but also various other images such as the windows of other application programs and the desktop screen. A screen image identical to that displayed on the screen of the LCD 17 is displayed on the screen of the external display device 21 as well. The above-mentioned various other images mean images which cannot be generated by the external display device 21. When the display mode of the TV application program 203 is switched to the full-screen mode, the video corresponding to the video content data is enlarged and displayed on the entire screen of the LCD 17. In this case, the screen image displayed on the screen of the LCD 17 includes only the video corresponding to the video content data, and almost no other images are displayed on the screen of the LCD 17. Only a screen image identical to that displayed on the screen of the LCD 17, that is, the video corresponding to the video content data is displayed on the screen of the external display device 21 as well. A screen image in the full-screen mode can be generated by receiving and reproducing the video content data using a resource in the external display device 21. In addition, the use of a resource in the external display device 21 often makes it possible to display a video with a higher quality.

Therefore, in the embodiment, the operation mode of the external display device 21 is automatically switched from the first mode (external input mode) to the second mode in response to a change of display mode of video content data from the window mode to the full-screen mode. This makes it possible to effectively use a resource in the external display device 21.

In mode switching event 2, the computer 10 receives and reproduces video content data from an external device via a wireless network, and displays the video content data on the screen of the LCD 17. Also, mode switching event 2 is used when a video corresponding to the video content data is displayed on the screen of the external display device 21. Note that the external display device 21 can receive and reproduce video content data from an external device via, for example, a wired network that is less subject to the influence of the communication environment than a wireless network. Examples of the external device include a server on a video distribution site connected to the Internet, and a NAS storage such as a home network.

When mode switching event 2 is used, upon generation of noise or degradation in communication quality such as the communication rate in a wireless network, the operation mode of the external display device 21 is switched from a first mode (external input mode) to a second mode such as a mode (LAN network mode) in which video content data is received and reproduced via a wired network. Switching to the LAN network mode makes it possible to more stably receive video content data than when a wireless network is used.

Mode switching event 3 is used when the operation mode of the external display device 21 is switched in response to a user operation. The operation mode of the external display device 21 is switched as the user operates, for example, the keyboard 13 or selects, for example, the GUI displayed on the screen of the computer 10.

The above-mentioned three mode switching events are detected by the detector 307 to be described below. The detector 307 includes a mode change detector 307*b* and communication quality detector 307*c*. The detector 307 detects the state (display mode and communication quality) of the above-mentioned first video data obtained by reproducing video content data using the TV application program 203.

The mode change detector 307*b* detects mode switching event 1. The mode change detector 307*b* detects a change of display mode from the window mode to the full-screen mode, as described above.

The communication quality detector 307*c* detects mode switching event 2. The communication quality detector 307*c* detects that communication quality of a wireless network, as described above, is degrading or degraded.

The detector 307 also detects mode switching event 3. The detector 307 detects, for example, a user operation performed via the main processor 309 which controls the channel information acquisition module 305, image data transmit module 306, detector 307, and mode switching module 308.

The system configuration of the external display device 21 will be described below with reference to FIG. 4.

An example of the external display device 21 is a liquid crystal television (for example, an LCD television). In FIG. 4, a digital television receiver 21 as an example of the external display device 21 is explained.

The digital television receiver 21 includes, for example, a video display module 36, speaker 100, operation module 37, remote controller interface 20, external input terminal 34, HDMI control circuit 35, LAN 39, broadcast signal input terminal 48, output terminal 63, tuner 49, signal processing module 51, video processing module 58, and controller 65.

The broadcast signal input terminal 48 is connected to a terrestrial broadcast reception antenna 47. The remote controller interface 20 receives a signal output from a remote controller 38.

The controller 65 controls the operation of each module in the digital television receiver 21. The controller 65 includes a CPU 70, ROM 66, RAM 67, and nonvolatile memory 68. The ROM 66 stores a control program executed by the CPU 70. The nonvolatile memory 68 stores various types of setting information and control information. The CPU 70 loads commands and data required for processing into the RAM 67, and executes the processing.

The controller 65 receives operation information from the operation module 37 or operation information from the remote controller 38 received via the remote controller interface 20. The controller 65 controls each module reflecting details of this operation information.

The terrestrial broadcast reception antenna 47 receives a terrestrial digital television broadcast signal. The terrestrial broadcast reception antenna 47 outputs the received terrestrial digital television broadcast signal to the tuner 49 via the broadcast signal input terminal 48. The tuner 49 tunes in the channel of a broadcast signal selected by the user from that terrestrial digital television broadcast signal. The tuner 49 outputs the tuned broadcast signal to a demodulator 50. The demodulator 50 demodulates the broadcast signal tuned to by the tuner 49 into a digital video signal and audio signal. The demodulator 50 outputs the demodulated digital video signal and audio signal to the signal processing module 51.

The signal processing module 51 performs predetermined digital signal processing for the digital video signal input from the demodulator 50. The signal processing module 51 outputs the video signal and audio signal having undergone the predetermined digital signal processing to the video processing module 58 and an audio processing module 59.

The audio processing module 59 converts the input digital audio signal into an analog audio signal that can be reproduced by the speaker 100. The audio processing module 59 outputs the analog audio signal to the speaker 100. The speaker 100 reproduces voice based on the input analog audio signal. The audio processing module 59 may further output the analog audio signal to the outside via an output terminal 64.

The video processing module 58 converts the input digital video signal into an analog video signal that can be displayed on the video display module 36.

The video display module 36 includes an LCD (Liquid Crystal Display) 36*b* and backlight panel 36*c*.

The external input terminal 34 is connected to the computer 10 via an HDMI cable. The digital television receiver 21 receives image data (digital video signal) sent from the computer 10 via the external input terminal 34.

The HDMI control circuit 35 performs predetermined signal processing so that the signal processing module 51 can perform the above-mentioned predetermined digital signal processing for the image data received via the external input terminal 34.

Also, the signal processing module 51 includes an input signal selector 51*b*. The input signal selector 51*b* selects a television broadcast signal (TV signal) sent to the signal processing module 51 via, for example, the tuner 49, or a signal (external input signal) sent from the computer 10 via the external input terminal 34.

The input signal selector 51*b* selects the TV signal or the external input signal in response to a mode switching request sent from the computer 10 via the HDMI cable or the LAN 39. The signal processing module 51 performs the above-mentioned signal processing for the signal selected by the input signal selector 51*b*.

An example of an operation of switching the operation mode of an external display device in the embodiment will be described below with reference to FIG. 5.

Figure 5:
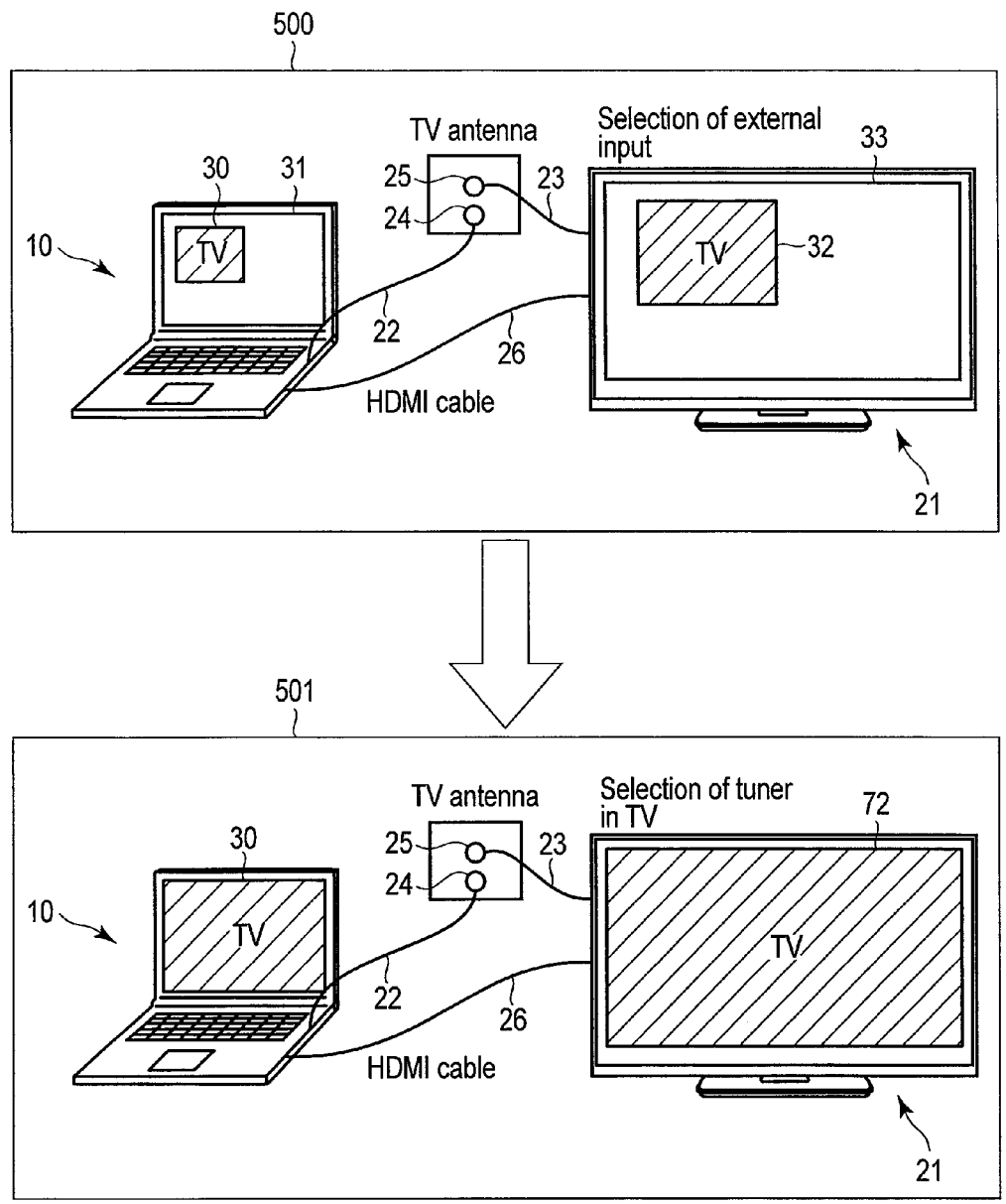
FIG. 5 is an exemplary view for explaining an operation of switching the operation mode of the external display device by the electronic apparatus in the embodiment.

FIG. 5 shows a state transition (switching of the operation mode) from a state 500 to a state 501. In the state 500, a video corresponding to a broadcast program data television video is displayed on a desktop screen 31 of the computer 10 in the window mode, and a screen image identical to the desktop screen 31 is displayed on a screen (external display screen) 33 of the external display device 21 in the clone display mode. In the state 501, a video corresponding to broadcast program data is displayed on the desktop screen 31 in the full-screen mode, and a video corresponding to broadcast program data received by the tuner 49 in the external display device 21 is displayed on the external display screen 33.

The state 500 will be described below in more detail.

The computer 10 is connected to a TV antenna terminal 24 via an antenna cable 22. The computer 10 is also connected to the external display device 21 via an HDMI cable 26. The computer 10 receives a television broadcast signal via the antenna cable 22. A video corresponding to broadcast program data of the selected channel is displayed in an area 30 set on the desktop screen 31 (window mode). The area 30 corresponds to the window of the TV application program 203 mentioned above.

The external display device 21 is connected to a TV antenna terminal 25 via an antenna cable 23. Also, on the external display device 21, a mode in which a video corresponding to broadcast program data of a predetermined channel in a television broadcast signal received from the antenna cable 23 is defined as a "broadcast wave mode", and a mode in which image data received from the computer 10 via the HDMI cable 26 is defined as an "external input mode".

In the state 500, the "external input mode" is selected on the external display device 21, and a screen image identical to the screen image displayed on the desktop screen 31 is displayed on the external display screen 33. More specifically, the entire screen image of the desktop screen 31 of the computer 10 is displayed on the external display screen 33. An area 32 on the external display screen 33 corresponds to the area 30 on the desktop screen 31, and displays a video of broadcast program data being reproduced by the computer 10.

The state 501 will be described next.

A video corresponding to broadcast program data is displayed on the desktop screen 31 in the full-screen mode. That is, the area 30 is extended to cover the entire desktop screen 31. On the other hand, on the external display device 21, the operation mode is changed from the "external input mode" to the "broadcast wave mode". In other words, a television broadcast signal is received via the antenna cable 23, and external display screen 33 displays a video of broadcast program data corresponding to a channel being tuned to by the computer 10, as shown in, for example, an area 72.

Figure 6:
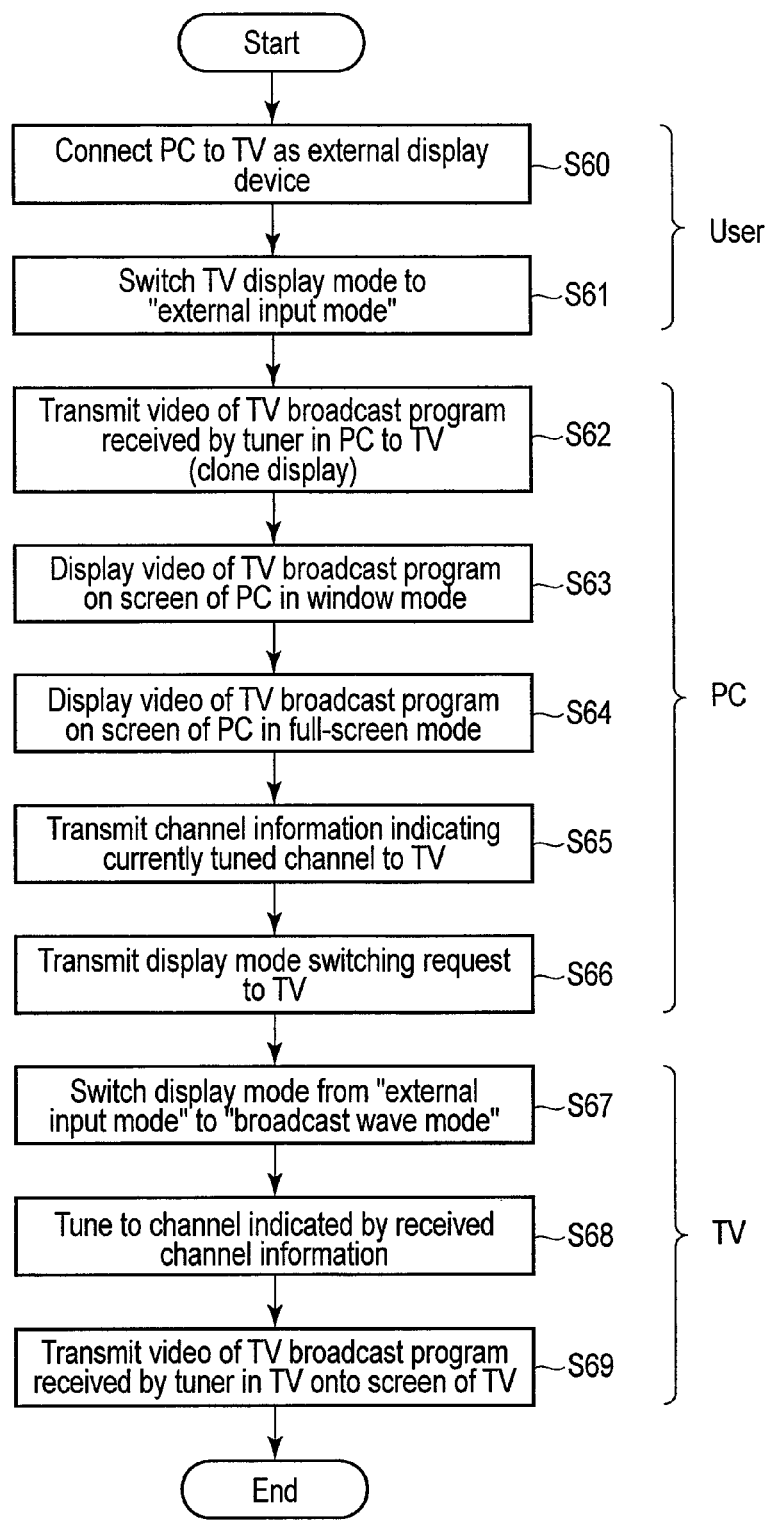
FIG. 6 is an exemplary flowchart showing the procedure of a display control process executed by the electronic apparatus in the embodiment.

The procedure of a display control process in the embodiment will be described below with reference to FIG. 6.

First, the user connects the external display device (TV) 21 to the computer 10 (step S60). The user connects, for example, each of the two ends of the HDMI cable 26 to the HDMI terminal 2 and external input terminal 34. The user switches the display mode of the external display device 21 to the "external input mode" (step S61).

A video (image) corresponding to broadcast program data received by the TV tuner 117 in the computer 10 is transmitted to the external display device 21 (step S62). A screen image displayed on the LCD 36*b* of the external display device 21 is identical to the screen image displayed on the LCD 17 of the computer 10 (clone display mode). In other words, the LCD 36*b* displays a screen image including a video corresponding to a television broadcast program of the computer 10.

A video corresponding to broadcast program data is displayed on the LCD 17 in the window mode (step S63). With this operation, the video of the broadcast program data is displayed in the area 32 on the external display screen 33, as described in reference to the state 500 shown in FIG. 5. The video of the broadcast program data displayed in the window mode is displayed in the full-screen mode (step S64). In this manner, when the display mode is switched from the window mode to the full-screen mode, the display control program 202 transmits a mode switching request including channel information indicating the currently tuned channel, as described above, to the external display device 21. In this case, the mode switching request may include a mode switching instruction command and channel information, or may include only channel information and not include the above-mentioned command. Also, channel information and mode switching request (command) may be independently transmitted (steps S65 & S66).

When the external display device 21 supports a mode switching request, the operation mode is switched from the "external input mode" to the "broadcast wave mode" in response to the mode switching request received from the computer 10 (step S67). Also, the external display device 21 tunes to a channel indicated by the channel information received from the computer 10 (step S68). The external display device 21 then performs a process for displaying, on the LCD 36*b*, a video corresponding to broadcast program data of the channel tuned to by the tuner 49 (step S69).

Some examples of video content data will be described below with reference to FIG. 7.

The computer 10 and external display device 21 are connected to each other via an HDMI cable. The computer 10 sends video data (Video1 or Video2) to the external display device 21 via an HDMI cable. The external display device 21 displays video data sent from the computer 10 on the external display screen 33.

Also, the external display device 21 can receive video data of Video1 or Video2 via, for example, the above-mentioned LAN 39 different from an HDMI cable.

Figure 7:
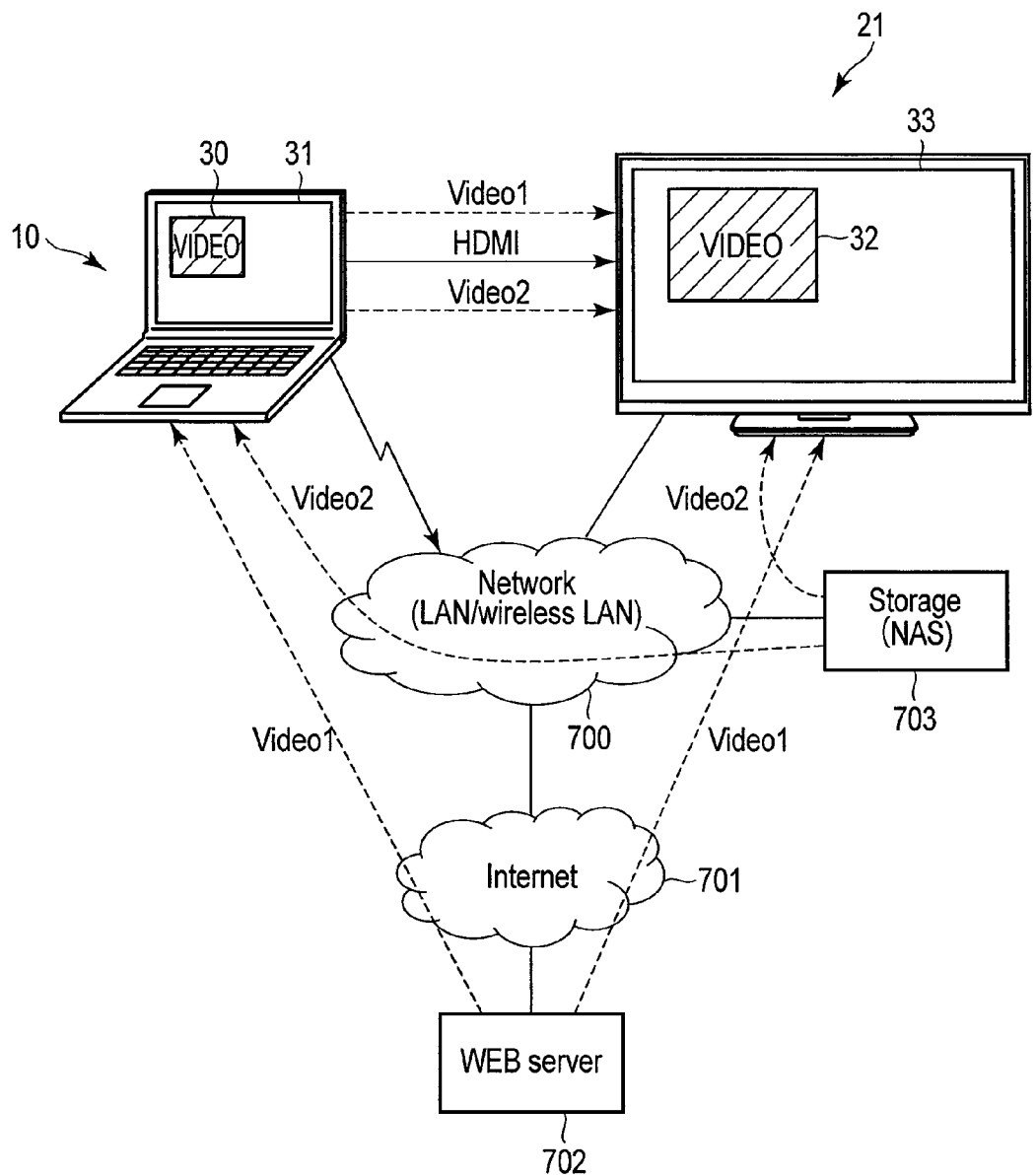
FIG. 7 is an exemplary block diagram for explaining an example of video content data reproduced by the electronic apparatus in the embodiment.

Referring to FIG. 7, the computer 10 receives Video1 from a WEB server 702. The external display device 21 also receives Video1 from the WEB server 702. The WEB server 702 is an Internet server connected to the Internet 701. The WEB server 702 is a server which transmits video data to the computer 10 and/or the external display device 21 in response to requests from the computer 10 and external display device 21 to acquire the video data. More specifically, each of the computer 10 and external display device 21 receives Video1 from the WEB server 702 via a network (LAN/wireless LAN) 700 connected to the WEB server 702 via the Internet 701.

Each of the computer 10 and the external display device 21 receives video data (Video2) stored in a storage (NAS) 703 via the network 700. The NAS 703 is connected to each of the computer 10 and external display device 21 via the network 700 in accordance with a standard such as DLNA (Digital Living Network Alliance).

Identification information to identify video data will be described below. Identification information associated with Video1 includes, for example, the URL address of the WEB server 702. Identification information associated with Video2 includes a storage path indicating the storage location of Video2. The storage path includes, for example, path information indicating a directory in the NAS 703 which stores Video2 and the file name of a data file of Video2.

As described above, according to the embodiment, the image data transmit module 306 transmits image data including first video data generated by reproducing video content data to the external display device 21. Also, the display control program 202 controls to be displayed a video (image) corresponding to the image data on the screen of the external display device 21. In this case, to display, on the screen of the external display device 21, a video (image) corresponding to second video data obtained by receiving and reproducing video content data using a resource in the external display device 21, a mode switching request including identification information to identify the video content data is transmitted to the external display device 21. This makes it possible to effectively use a resource in the external display device 21, thus improving the quality such as the image quality of a video corresponding to video data displayed on the screen of the external display device 21. Also, switching for using a resource in the external display device 21 can automatically be performed by detecting a change of display mode of the video content data from the window mode to the full-screen mode, or degradation in communication quality of the wireless network during reception of the video content data. With this operation, by interlocking the computer 10 and the external display device 21, an appropriate (superior) resource can automatically be selected without requiring the user to select a resource by himself or herself. Moreover, the mode switching module 308 sends information to identify video content data to the external display device 21. Hence, even when the resource used is switched from a resource of the computer 10 to a resource of the external display device 21, first video data and second video data can be generated from identical video content data.

(Modification)

A modification to the embodiment will be described below.

In the embodiment, by switching the operation mode of the external display device 21 from the "external input mode" to the "broadcast wave mode", an resource in the external display device 21 as an effective resource is automatically selected for a video corresponding to video content data displayed on the screen of the external display device 21.

The case wherein content data (second content data) other than video content data, such as content data of, for example, a text in the WEB browser is displayed on the screen of the external display device 21 will be described in the modification.

For example, second content data can often be displayed on the screen of the external display device 21 with a quality higher when a resource of the computer 10 is used than when a resource of the external display device 21 is used. In other words, for second content data, a resource of the computer 10 is often more appropriate than a resource of the external display device 21.

More specifically, it is assumed that a video (image) corresponding to video content data and a text corresponding to second content data, respectively, are displayed on the screen of the computer 10 in the "external input mode". In this case, by performing the above-mentioned display control process, the operation mode of the external display device 21 is switched from the "external input mode" to the "broadcast wave mode". Then, the detector 307 detects, for example, switching of the display mode from the full-screen mode to the window mode, or a reduction in area 30 which displays a video corresponding to video content data reproduced by the computer 10. The mode switching module 308 may transmit a second mode switching request for switching the mode of the external display device 21 from the "broadcast wave mode" to the "external input mode". This makes it possible to automatically select a resource appropriate for second content data, that is, a resource of the computer 10.

The function of each module as shown in FIG. 3 can be implemented by software (computer programs). Hence, by only installing and executing these programs in the computer via a computer readable storage medium storing the programs, the same effects as in this embodiment can be easily implemented.

Note that the function of each module shown in FIG. 3 may be implemented by hardware such as a dedicated LSI or DSP.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a receiver comprises a wireless communication device configured to receive video content data from an external device via a wireless network;
a first detector configured to detect degradation in communication quality of the wireless network during reception of the video content data;
a reproducer configured to reproduce the video content data to generate first video data;
a display configured to display an image corresponding to the first video data on a screen of the display;
a transmitter configured to transmit image data to an external display device, the image data comprising the first video data; and
a processor configured to transmit, when the degradation in communication quality of the wireless network is detected, to the external display device a mode switching request comprising identification information for identifying the video content data to switch an operation mode of the external display device from a first mode in which an image corresponding to the image data is displayed on a screen of the external display device to a second mode in which an image corresponding to second video data is displayed on the screen of the external display device, the second video data being obtained by receiving and reproducing the video content data by resources in the external display device.

2. The apparatus of claim 1, wherein the image data comprises screen image data indicative of a screen image displayed on the screen of the display, the apparatus further comprises a second detector configured to detect a change of a display mode of the video content data from a window mode to a full-screen mode, and the processor is further configured to transmit the mode switching request to the external display device when the change of the display mode is detected.

3. The apparatus of claim 1, wherein the receiver further comprises a tuner configured to receive and tune in the channel of a television broadcast signal, the video content data comprises broadcast program data corresponding to a channel tuned by the tuner, and the identification information is configured to indicate is indicative of the tuned channel.

4. The apparatus of claim 3, wherein the image data comprises screen image data indicative of a screen image displayed on the screen of the display, the apparatus further comprises a second detector configured to detect a change of a display mode of the broadcast program data displayed on the screen of the display from a window mode to a full-screen mode, and the processor is further configured to transmit the mode switching request comprising information indicative of the tuned channel as the identification information to the external display device in response to detection of the change of the display mode from the window mode to the full-screen mode.

5. The apparatus of claim 1, wherein the external display device comprises a television receiver.

6. A display control method comprising:

receiving video content data from an external device via a wireless network by an electronic apparatus;

detecting degradation in communication quality of the wireless network during reception of the video content data;

displaying, on a screen of a display of the electronic apparatus, an image corresponding to first video data obtained by reproducing the video content data;

transmitting image data comprising the first video data to an external display device; and transmitting, when the degradation in communication quality of the wireless network is detected, to the external display device a mode switching request comprising identification information for identifying the video content data to switch an operation mode of the external display device from a first mode in which an image corresponding to the image data is displayed on a screen of the external display device to a second mode in which an image corresponding to second video data is displayed on the screen of the external display device, the second video data being obtained by receiving and reproducing the video content data by resources in the external display device.

7. A computer-readable, non-transitory storage medium having stored thereon a computer program which is executable by a computer, the computer program controlling the computer to execute functions of:

receiving video content data from an external device via a wireless network;

detecting degradation in communication quality of the wireless network during reception of the video content data;

displaying, on a screen of a display of the computer, an image corresponding to first video data obtained by reproducing the video content data;

transmitting image data comprising the first video data to an external display device; and transmitting, when the degradation in communication quality of the wireless network is detected, to the external display device a mode switching request comprising identification information for identifying the video content data to switch an operation mode of the external display device from a first mode in which an image corresponding to the image data is displayed on a screen of the external device to a second mode in which an image corresponding to second video data is displayed on the screen of the external display device, the second video data being obtained by receiving and reproducing the video content data by resources in the external display device.

* * * * *